United States Patent [19]

McGahee

[11] Patent Number: 4,924,618

[45] Date of Patent: May 15, 1990

[54] REMOVABLE WEED GUARD AND REEF GUARD

[75] Inventor: Welbourne D. McGahee, Melbourne, Fla.

[73] Assignee: Loop-A-Line, Inc., Melbourne, Fla.

[21] Appl. No.: 199,377

[22] Filed: May 27, 1988

[51] Int. Cl.$^5$ .............................................. A01K 83/00
[52] U.S. Cl. ........................................ 43/43.6; 24/237; 43/42.72; 43/42.09; 43/42.22; 43/44.83
[58] Field of Search .................... 43/1, 4, 42.09, 42.22, 43/42.43, 42.44, 42.53, 43.6, 44.83, 42.72, 43.4; 24/230.5 W, 233, 236, 237, 552, 553, 555; 81/180.1, 488

[56] References Cited

U.S. PATENT DOCUMENTS

| | | | |
|---|---|---|---|
| 10,771 | 4/1854 | Buell | 43/43.6 |
| 1,892,678 | 1/1931 | McIntyre | 24/237 |
| 2,228,513 | 1/1941 | Frisbie | 43/42.09 |
| 2,255,222 | 9/1941 | Leusch | 43/42.43 |
| 2,800,736 | 7/1957 | Beilharz | 43/1 |
| 2,892,282 | 1/1957 | Rentz | 43/42.72 |
| 3,040,466 | 6/1962 | Jablonski | 43/42.09 |
| 3,231,999 | 2/1966 | Gurka | 43/42.09 |
| 3,241,201 | 3/1964 | Chester | 24/73 |
| 3,349,513 | 10/1967 | Jeff | 43/42.53 |
| 3,352,051 | 11/1967 | Stewart, III | 43/43.6 |
| 3,588,078 | 6/1971 | Van De Sande | 43/1 |
| 3,605,318 | 9/1971 | Santo et al. | 43/43.6 |
| 3,974,587 | 8/1976 | Levake et al. | 43/44.83 |
| 4,214,398 | 7/1980 | Campbell et al. | 43/43.16 |
| 4,229,899 | 10/1980 | McGahee | 43/42.09 |
| 4,467,550 | 8/1984 | Haulk | 43/42.53 |

FOREIGN PATENT DOCUMENTS 0142875  5/1985  European Pat. Off. ............. 43/43.4

Primary Examiner—Nicholas P. Godici
Assistant Examiner—Mike Starkweather
Attorney, Agent, or Firm—Berman, Aisenberg & Platt

[57] ABSTRACT

A removable and replaceable weed guard may be added to a fish hook to prevent the hook from becoming entangled with weeds. The weed guard may be made of wire or other spring material and a set of weed guards may be used to calibrate a hook so that the depth and speed of motion of a lure to which the hook is attached may be controlled. The weed guard of the invention is a bait saver, since it prevents live bait from accidentally falling off the hook.

A connecting loop for securing to a lure and a figure-eight connector for attaching a fish hook to a lure are also described. A hand tool is useful for attaching the connector.

39 Claims, 10 Drawing Sheets

FIG. 10 (PRIOR ART)
FIG. 11
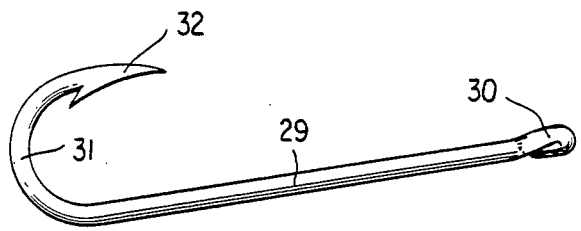
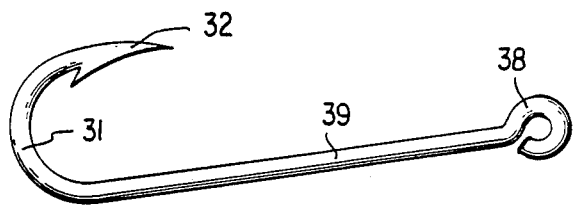
FIG. 10A (PRIOR ART)
FIG. 11A
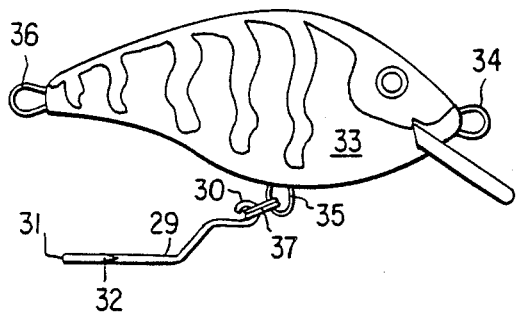
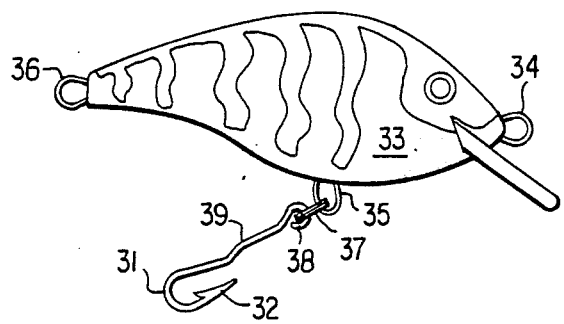
FIG. 12 (PRIOR ART)
FIG. 13
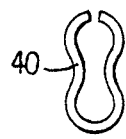
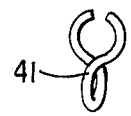
FIG. 13A
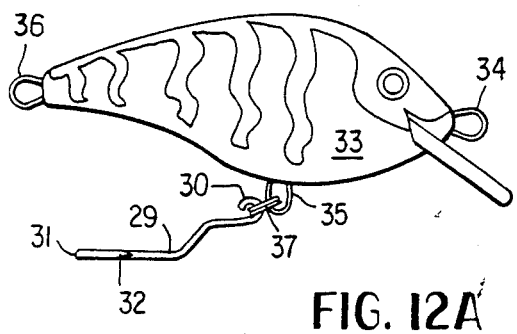
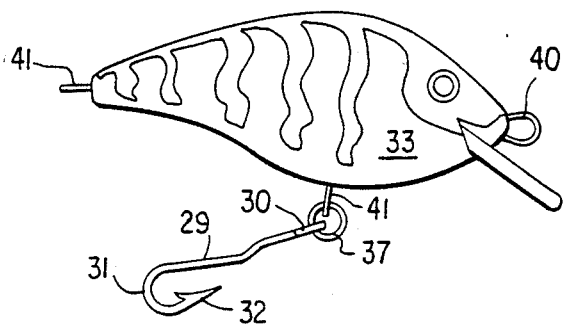
FIG. 12A (PRIOR ART)

FIG. 14 (PRIOR ART)
FIG. 15
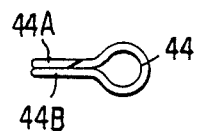
FIG. 15A
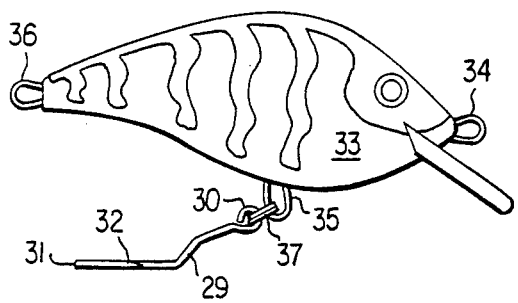
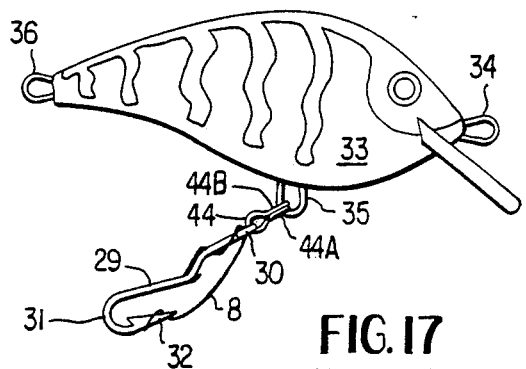
FIG. 16 (PRIOR ART)
FIG. 17 (PRIOR ART)
FIG. 18 (PRIOR ART)
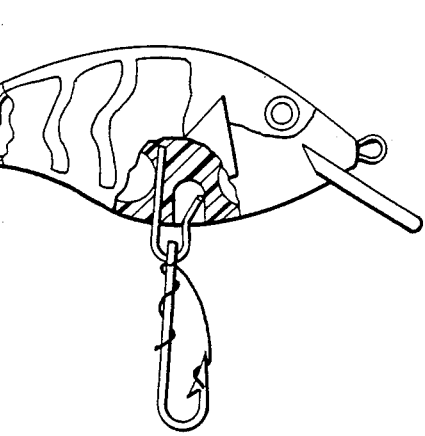
FIG. 19A (PRIOR ART)    FIG. 19B (PRIOR ART)    FIG. 19C (PRIOR ART)    FIG. 19D (PRIOR ART)
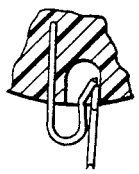 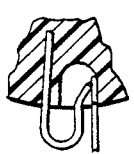 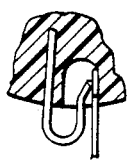 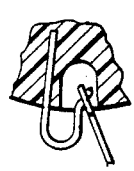
FIG. 20A (PRIOR ART)    FIG. 20B (PRIOR ART)    FIG. 20C (PRIOR ART)    FIG. 20D (PRIOR ART)
 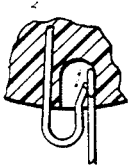  

FIG. 23A
(PRIOR ART)
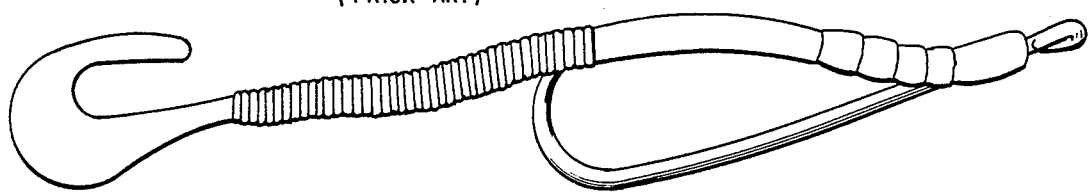
FIG. 23B
(PRIOR ART)
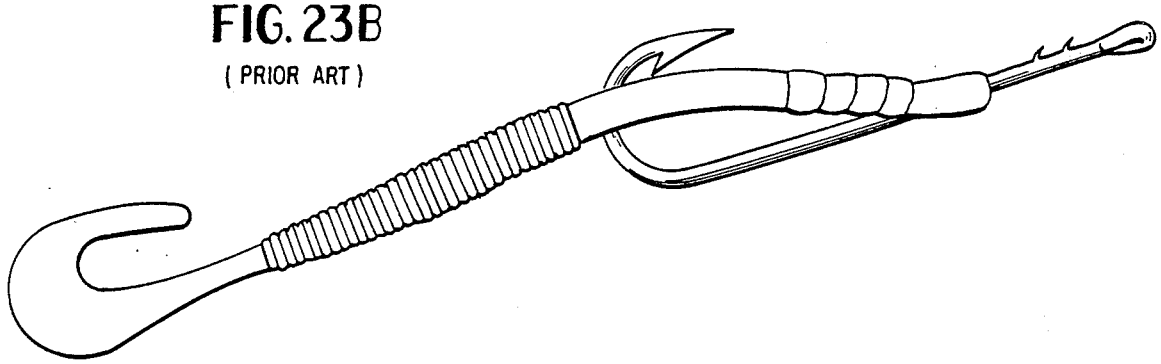
FIG. 23C
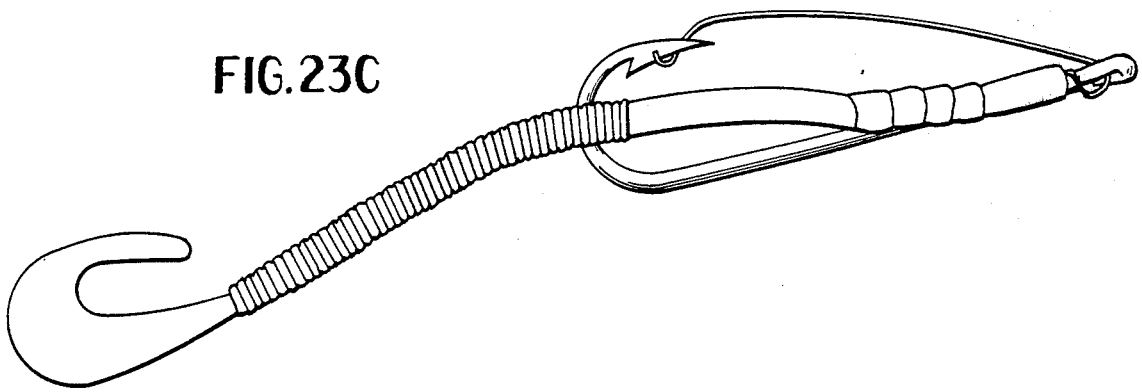
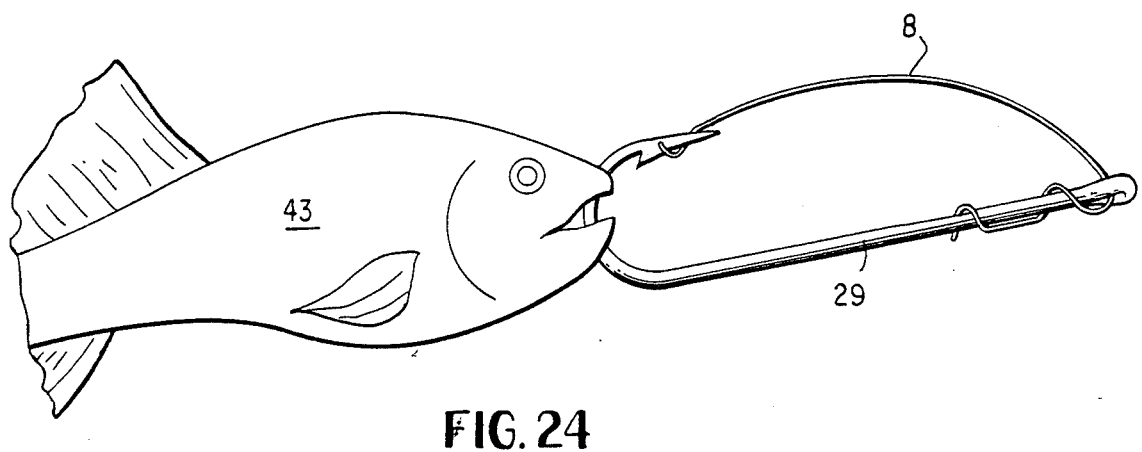
FIG. 24

REMOVABLE WEED GUARD AND REEF GUARD

FIELD OF THE INVENTION

The invention relates to hook barb and point protection for all types of fishing apparatus. Weed guards of the invention are removable and replaceable, and of different calibrated weights so as to change the effective density of lures to which the weed guards are attached.

BACKGROUND OF THE INVENTION

Known ways to make hooks weedless have embodied several different ways to secure a wire weed guard to a fish hook, including securing the weed guard to the hook by means of wire or plastic or by using lead or similar material poured around the hook shank.

All of these devices are put together at the factory and make the hook heavy. When wire material becomes fatigued and breaks, the hook is no longer weedless, and the person fishing must obtain a replacement. A heavy weight precludes a hook from being used with some lures as the lure will sink with the addition of extra weight.

Known weedless devices are manufactured to be permanent and the person fishing cannot remove and replace the wire forms. Also, hooks which use lead to hold the weed guard on the hook do not fall properly in the water as the hook is heavier on the leaded end, thereby falling like a jig does—lead end down.

When top water fishing with lures, spoons, spinners, plastic worms, etc., the person fishing cannot go into the weeds or lily pads, or around boat docks and dead trees where the fish like to hide, because the barbs and points on the hooks catch everything but fish.

Using known treble hooks and single barbed hooks, the bait (i.e., spoons, lures, spinners, etc.) must be kept moving so as to avoid the hooks falling to the bottom where the trash is located and where the hooks will snag on the trash. When bait is moved fast, to avoid hooking up on bottom trash, the bait passes too fast for the fish to catch it. If the bait is moved slowly, the hook catches on the trash, as discussed above.

Artificial baits or fishing lures used for trolling, casting, or jigging are designed to operate at predetermined depths. The depth of operation of a fishing lure is a function of the density of the lure assembly, its hydrodynamic shape and speed of forward motion. Lure density and shape are fixed during manufacture so the depth at which the lure will operate properly is fixed. A user cannot vary the operating depth of a lure to place it at the same depth as the fish. In some cases a lure may be made to dive deeper or shallower by varying the retrieval rate, but the shape of a lure dictates that it should be retrieved or trolled at a set speed to achieved the most lifelike action. Thus, a successful fisherperson must have a large variety of fishing lures designed to operate at various depths at which fish may be found. In may cases a lure having the proper motion through the water does not have the proper density and therefore the lure which should be most successful in attracting fish fails to reach them.

Single barbed hooks used with split rings to secure treble hooks to lures won't work with single barbed hooks as the split ring makes a single barbed hook lie 90° to the left or right of the lure body instead of up or down, as desired.

OBJECTS OF THE INVENTION

It is a primary objective of the present invention to provide means to overcome limitations of present weedless hooks.

An object of the invention is to make weedless devices which enable single barbed hooks to be used on hard bait lures, spoons, spinners, worm, hooks, live bait, etc., in order that fishing apparatus can be used in weeds, rivers, lakes, and in ocean reef fishing, water grasses, logjams, and rocks, while minimizing accidental fouling of the fishing apparatus.

A further object is to allow use of single hooks to replace treble hooks, so that fish are injured less (for a fresher catch or for releasing healthier fish).

A still further object is to provide a single point hook which can be removed from fish quicker and more safely than a treble hook, thus allowing more casts to be made in a day. In certain areas, regulations mandate use of single hooks.

A still further object is to provide a device for converting a hook by attaching a device to the hook to make it weedless and by detaching the device to quickly convert the hook back to an "open" hook.

A further object is to provide a bait-saver, by totally enclosing the bait, to prevent live bait (especially minnows) from accidentally falling off the hook.

A still further object is to provide a weedless trailer (stinger) hook for spinner baits, buzz baits and spoons.

Another object is to improve live bait fishing by providing weedless hooks for use on live bait so that the total weight does not turn the fish upside down.

A still further object is to enable dead bait to be secured on a hook and to prevent the bait from coming off the hook when a hole is worn in the bait.

A further object is true free-lining live bait.

Yet another object is to provide a new means for rigging a plastic worm on a hook while protecting the barb and point.

Still another object is to reduce the shipping cost of hooks by reducing the total weight of the hook and weed guard. The weed guard is detachable, and the cost to ship the hook from the point of manufacture to the point of assembly is reduced to the shipping weight of the hook alone, thereby creating great savings.

Another object of the invention is to use a weed guard to achieve neutral, positive or negative balance of a lure.

A further object of the present invention is to provide means for changing the effective density of a fishing lure so that the lure may be presented to the fish regardless of the depth at which the fish may be feeding.

A further object is to provide a fishing lure system in which a weed guard may rapidly be attached to and used with a hook to make the lure weedless. Weed guards may be of different calibrated weights in order to vary the density of the lure effectively, thereby allowing the lure to float, sink, or be suspended, as may be desired.

Another object is to help blind people to fish by reducing the likelihood of the bait catching on weeds.

A further object is to increase the enjoyability of night fishing.

A still further object is use of a tool to acquire leverage control on a new connector which is small and hard to hold.

Yet another object is use of a tool to store small parts.

SUMMARY OF THE INVENTION

The invention disclosed herein is a removable weed guard for single pointed hooks. The weed guard needs no tools for installing on or removing from hooks. It is light weight and easily adjusted.

The wire form of the weed guard is a single piece of wire having bends in each end. One end passes through the eye of the hook and then the end of the wire form nearest the hook shank passes over the shank and continues under the shank and the free end passes over the shank again and locks into place on the shank similarly to a corkscrew action around the shank. Once in place on the shank, any action against the wire form will tend to cause a spring action, thereby causing the weed guard to return to its original position once the pressure is released.

The end of the wire form that is passed through the hook eye is now in a correct position to have its bend placed under and in front of the hook barb nd point, thereby protecting the barb and point from catching on trash and weeds, etc.

To be able to use single point hooks on hard bait lures, it is necessary to change the angle of single point hooks to lie in an up or down mode. At present when securing hooks onto hard bait lures, the hook point lies to the left or right of the lure body. There are four ways of making the hook lie up and down. The first way is shown in my previous patent, U.S. Pat. No. 4,095,315, and shown in the drawings herein (FIGS. 16, 17, 18, 19A, B, C, D, 20A, B, C and D). The second way is by turning the hook eye 90° from that found in the presently known art. The third way is to rotate the hook eye 90° from the presently known orientation. The fourth means is by use of my Dawson connector which uses a standard hook eye and standard figure eight part now used by the tackle industry. This new Dawson connector rotates the hook 90° more than split rings now in use.

Another function of the invention, other than its use as a weed guard, is its function of changing the density of a lure so as to enable the fisherperson to make a lure either a sinker, a floater or a suspended lure. This change in density is accomplished by a set of calibrated wire weed guards of the invention.

A further function of this invention is to change the way in which plastic worms are rigged on hooks, to keep the worm on the hook more effectively and to reduce the cost of fishing with plastic worms. Using the present invention, the hook point is passed into the body of a plastic worm, but instead of passing the point back into the worm along its long axis, the point is passed into the plastic worm at right angles to its length, and this gives more material to support the hook inside the worm. The present weed guard of the invention protects the point of the hook, which is completely outside the worm, for easier hook setting.

The weed guard of the invention also helps hold live bait on the hook. A large hole is often worked in the live bait after a few casts, and the bait is either slung off or swims off of its own accord. The weed guard acts as a circle once it is in place, holding the live bait on the hook. The weed guard may also be used for trailer hooks for spoons and spinner type baits.

Using the weed guard of the invention, it is possible to slow down the retrieve rate, and the fishing apparatus can, if desired, come to a complete rest on the bottom, thereby increasing the chances of catching fish.

BRIEF DESCRIPTION OF THE DRAWINGS

FIG. 10 is a side elevational view of a prior art fish hook having an eye laying at 90° to the hook curve.

FIG. 10A is a side elevational view of a lure body having a hook of FIG. 10 attached.

FIG. 11 is a side elevational view of a hook of the invention showing the hook eye lying in the same plane as the hook curve.

FIG. 11A is a side elevational view of a lure body having a hook of FIG. 11 engaged therewith.

FIG. 12 is a front elevational view of a figure eight connector of the prior art.

FIG. 12A is a side elevational view of a lure body engaged with a prior art hook using a prior art connector of FIG. 12.

FIG. 13 is a side elevational view of a connector of the invention.

FIG. 13A is a side elevational view of a lure body having a connector of FIG. 13 engaged in the lure body and connected to a standard ring and fish hook.

FIG. 14 is a side elevational view of a prior art fish hook, connector, split ring and fish hook.

FIG. 15 is a side elevational view of a hook connector of the invention.

FIG. 15A is a side elevational view of lure body showing use of the connector of the invention shown in FIG. 15.

FIG. 16 is a side elevational view partly in cross section, illustrating attachment of a fish hook including a weed guard of FIG. 3.

FIG. 17 is a spring wire retainer of the prior art.

FIG. 18 is another spring wire retainer of the prior art.

FIGS. 19A, B, C, and D illustrate the sequence of placing a hook eye on a retainer of the prior art.

FIGS. 20A, B, C, and D illustrate the sequence of removing a hook eye from a retainer of the prior art.

FIG. 23 is a side elevational view of a Texas-rigged plastic worm of the prior art.

FIG. 23B is a side elevational view of a Texas-rigged plastic worm of the prior art, after use.

FIG. 23C is a side elevational view illustrating a plastic worm mounted on a hook having a weed guard on FIG. 3 engaged therewith.

FIG. 24 is a side elevational view of a hook with live bait and a weed guard of FIG. 3.

DETAILED DESCRIPTION OF THE INVENTION

Figure 1:
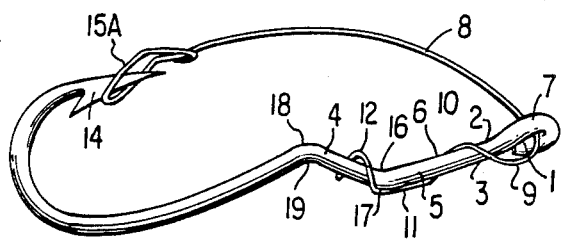
FIG. 1 is a perspective view of a weed guard of the invention engaged on a fish hook.

The novel concepts embodied in this application include hook barb and point protection for applying and removing by the fisherperson. The invention includes means for exchanging treble hooks or lures, spoons, and spinners, for single point hooks by using a removable weed guard of the invention for changing the buoyancy of lures to control descent and ascent. A suitable weed guard may be selected from a set of weed guards of different calibrated weights to change the effective density of the lure to which the weed guard is attached.

Using a weed guard of the invention, the weight is distributed evenly over the length of the hook, allowing the hook and bait to fall normally and to appear lifelike to the fish. The bait may be live or other bait.

When bottom water fishing with a weedguard of the present invention attached to the hook, a single barbed hook may be used on lures, spinner, spoons, and plastic worms. Because the lures are weedless, these lures are able to be used where the fish are hiding.

The present invention allows the habit to be presented slowly or even at a complete rest on the bottom of lakes, rivers, and reefs, without looking on tangled material where fish like to hide, This allows for more catches instead of hooking up on weeds or trash.

When using the weedguard of the invention with plastic (artificial) worms and lizards, the point and barb of the hook are out of the body of the plastic worm for improved hooking position. The hook remains weedless (as opposed to the Texas weedless rig, where the hook point and barb are placed inside the plastic body). Using the weed guard of the invention the hook can be set more effectively.

When using a rigged worm, the point is never exposed as the weed guard makes the hook weedless. Therefore, friction cannot affect getting into or out of weeds where the big bass are. Due to the nature of the new rigged worm (i.e., the curved section of the hook passing through the body of the worm at right angles to the pulling force), the worm is not allowed to move down the shank of the hook as occurs with a Texas Rig. Also, the need for small barbs on hooks for plastic worms is eliminated, thereby reducing the cost of the hook.

The present invention is economical. It extends the life of any plastic worm until a fish strikes it.

Single barbed weedless hooks are desirable on hard bait lures. Treble hooks cannot be made effectively. Therefore, use of these lures is limited to locations where the lures can be fished and retrieved without snagging. The invention allows a fisherperson to use a single barbed hook instead of using the widely used treble hook on hard bait lures.

Present weed guards in use are of a single piece of wire, but the wire is bent in such manner that it appears to be two pieces with both free ends of the wire permanently secured to the hook shaft by lead, plastic, or wire wrapping. When this type of wire guard is deformed and needs to be strengthened, it is nearly impossible to correct as a bend on one part of the wire exerts a deforming action on the other side. Weed guards of the invention may be made of spring wire, flat spring leaf (metal), fiberglass filament, boron filament, carbon filament or other appropriate material.

According to the invention, a single piece of wire is used for forming a weedguard, and when a correction is needed, the wire is easily adjusted. Due to the ease of adjustment, the tension can easily be set by the fisherperson, from high resistance to almost no resistance. This tension setting is desirable because fish often change their striking action. The tension is changed by bending the wire away from the hook's barb. The more the wire is bent away, the more force it takes dislodge it. Conversely, when the wire is bent toward the barb, reduced tension of the wire against the barb makes it easier to dislodge the wire from the hook's barb, thereby taking a lighter strike force to set the hook in the mouth of the fish.

The present invention also provides weedless trailer hooks so the fisherperson can extend the strike force to hooks on spinner baits, spoons, lures, etc. While weedless single barbed hooks are known, because of the means previously used to secure the wire weed guard to the hook, the hook made too heavy to be used with certain types of bait and the balance of the bait is destroyed.

Figure 2:
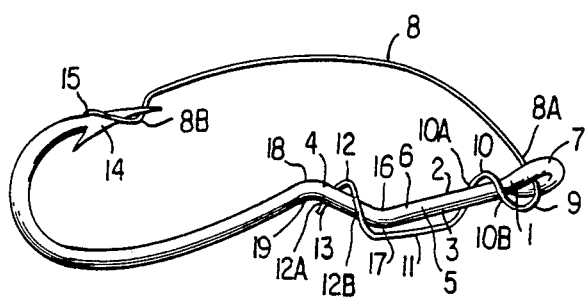
FIG. 2 is a perspective view of another weed guard of the invention engaged on a fish hook.
Figure 4:
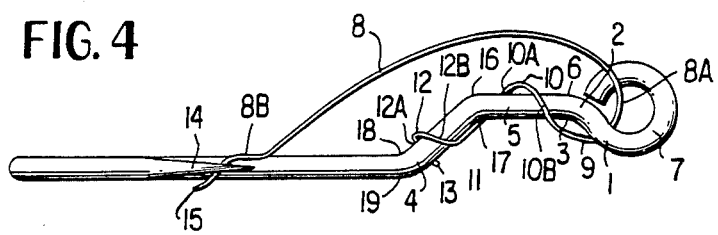
FIG. 4 is another side elevational view of the weed guard of FIG. 3 engaged on a fish hook.
Figure 5:
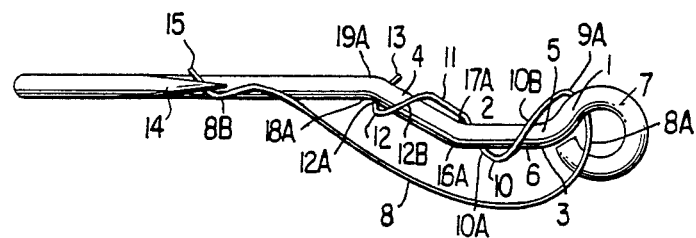
FIG. 5 is a side elevational view of a weed guard of FIG. 3 engaged on another fish hook.
Figure 6:
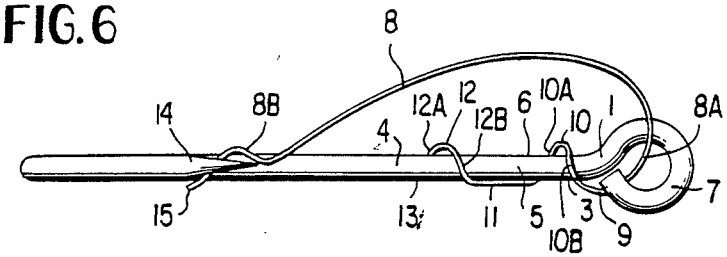
FIG. 6 is a side elevational view of a weed guard of FIG. 3 engaged on a straight fish hook.
Figure 3:
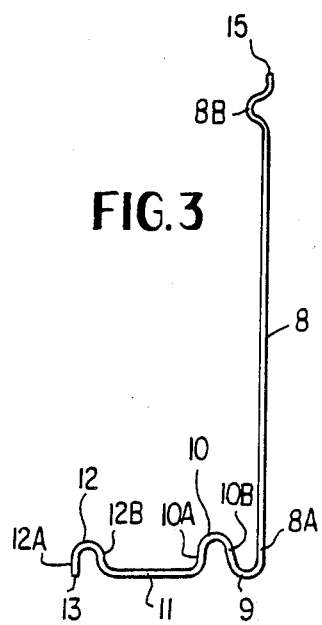
FIG. 3 is a side elevational view of a wire form for the weed guard shown in FIG. 2.
Figure 3A:
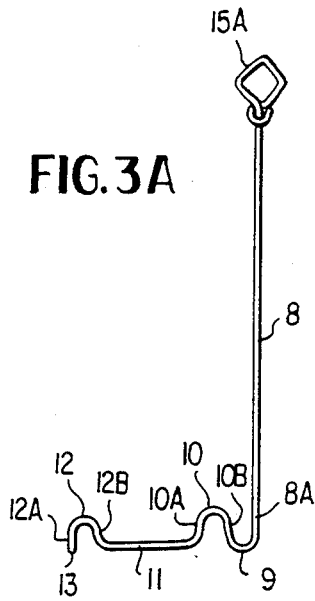
FIG. 3A is a side elevational view of a wire form for the weed guard shown in FIG. 1.

Referring to the drawings, in which like numerals represent like parts, FIGS. 3 and 3A show weed guards of the invention, and FIGS. 1, 2 and 4 to 6 show the weed guards of FIGS. 3 and 3A engaged on fish hooks. FIGS. 1, 2, 4 and 5 illustrate weed guards of the invention engaged on fish hooks of U.S. Pat. No 4,214,398. FIG. 6 shows a straight fish hook.

FIG. 3 illustrates a weed guard of the invention which may be added to a fish hook to make the hook weedless, and which may be removed and replaced with another weed guard. U-shaped end 12, adjacent tip 13, engages the hook shank portion between bends 17 and 19 and 16 and 18 of the hook, as shown in FIGS. 2 and 4. Straight portion 11 of weed guard 8 engages portion 3 of the hook shank, shown in FIG. 2. Portion 10A of the right side of weed guard 8 engages hook shank portion 6, shown in FIGS. 2 and 4, adjacent the eye. S-shaped portion 10 of the weed guard, shown in FIG. 3, is loaded against hook shank part 2, shown in FIG. 2. Left side 10B of the weed guard touches part 5 of the hook shank, as shown in FIG. 4. Elbow or bend 9 of the weed guard touches the shank portion at 1, shown in FIG. 2. Part 8A of the weed guard, shown in FIG. 3 touches portion 7 of the hook eye, shown in FIG. 2. Long portion or mast 8 of the weed guard extends between the eye portion and hook portion of the fish hook and makes the hook weedless. Hook-barb contacting portion 8B, shown in FIG. 3, engages hook point 14 as shown in FIG. 2. End 15 of weed guard 8, shown in FIG. 3, lies adjacent side of barb 14, as shown in FIG. 2.

FIG. 3A illustrates another embodiment of the removable, replaceable, weed guard of FIG. 3 in which end 15 is replaced by a diamond shaped end 15A which engages hook point 14, as illustrated in FIG. 1. Closed portion 15A hooks around one end of wire form part 8.

FIGS. 1 and 2 illustrate weed guards of FIGS. 3A and 3, respectively, engaged on a fish hook. FIGS. 4, 5 and 6 illustrate a weed guard of FIG. 3 engaged on different fish hooks. Engagement is similar in all cases.

Figure 7:
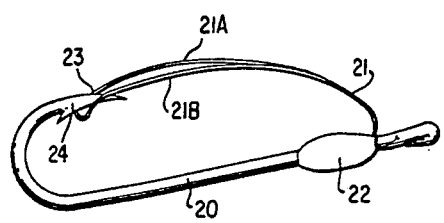
FIG. 7 is a side elevational view of a prior art weed guard engaged on a fish hook with a lead weight.
Figure 8:
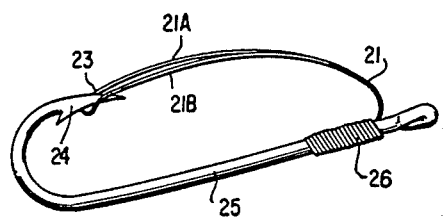
FIG. 8 is a side elevational view of a prior art weed guard of the prior engaged on a fish hook by wrapping.
Figure 9:
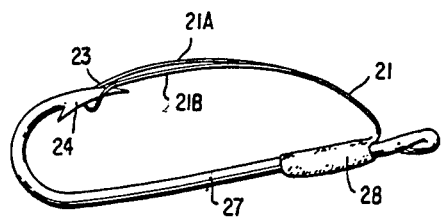
FIG. 9 is a side elevational view of a prior art weed engaged on a fish hook with plastic material.

FIGS. 7, 8 and 9 illustrate prior art weed guards attached to fish hooks by various means. FIG. 7 shows fish hook 20 having permanent fixed weed guard 21 secured in place by means of lead weight 22 on hook 20. Weed guard 21 includes left side portion 21A, right side portion 21B and bend portion 23. Bend portion 23 fits under barb 24 on hook 20. FIG. 8 shows a similar fish hook having weed guard 21 permanently secured to hook 25 by means of wire wrapping 26.

FIG. 9 shows a similar system to that shown in FIGS. 7 and 8 in which weed guard 21 is attached to hook 27 by plastic means 28 permanently securing weed guard 21 to hook 27.

FIG. 10 illustrates hook 29 of the prior art which is a typical hook in which hook eye 30 lies at 90° to hook curve 31. Hook 29 does not operate efficiently with hard bait lures since such lures force hook point 32 to lie at 90° to the left or right of the lure body. FIG. 12 illustrates a prior art figure eight wire form 40 which is the same as parts 34, 35, and 36 used on the lure bodies shown in FIGS. 10A, 11A, 12A, 14, 15A, 21C and 21E. FIG. 12A illustrates use of the connector of FIG. 12, shown as part 35 in FIG. 12A, which requires that the hook point on a single point hook lie in a left or right position with respect to the lure body.

FIG. 13 shows new connector 41 of the invention which corrects the problem shown in FIG. 12A by rotating the hook connector through 90° as shown in FIG. 13A. FIG. 13A is comparable to FIG. 12A (prior art) except that hook eye 30 on fish hook 29, shown in FIG. 10, now lies with the point of the hook up or down, as desired. FIG. 13A shows part 41 of the invention (FIG. 13A) in both the tail position and belly position on the lure, and part 40 (FIG. 12) in the nose position for securing the line. Part 41, shown in FIG. 13, may also be used in place of part 40 in the nose position.

FIG. 14, showing the prior art, illustrates the same problem as shown in FIG. 10A. FIG. 15 illustrates a new figure eight connector of the invention, shown enlarged in FIG. 21. Connector 44 has a loop at one end and a split ring having ends 44A and 44B at the other end. FIG. 15A shows use of connector 44 attached between connector 35 and hook 29. Connector 44 rotates hook 29, shown in FIG. 10, through 90° to make the hook point lie up or down on the lure, as desired. Weed guard 8, also shown in FIG. 3, is shown in place on hook 29. When weed guard 8 is in place on the hook, lure 33 can be fished wherever fish are located, including around trash, logs, weeds, rocks, etc., without snagging.

FIG. 16 illustrates a further means of correcting the problem using standard single point hooks which like to the left or right of the lure body, instead of lying up or down, as desirable. FIG. 16 shows the fishing lure system of U.S. Pat. No. 4,095,315, for connecting lure hooks to lure bodies. FIG. 16 shows a standard hook having a weed guard of the invention attached. As shown in FIGS. 19A through 19D, the hook is added to the lure first. The weed guard is then added to the hook. To reverse this procedure, the weed guard is removed before the hook is removed, as shown in FIGS. 20A through 20D.

FIGS. 17 and 18 show a wire retainer spring member 50 which is inserted into the lure shown in FIG. 16. Lure body 51, shown in FIG. 16 is provided with a bore 52 for each attachment means. Each bore is cup shaped, and is of suitable dimensions to receive free end 53 of spring retainer 54 and the other end 55 of the U-shaped spring retainer means 54 is secured to body 51 of the lure. FIGS. 19A through 19D illustrate the steps of connecting a hook eye to a preferred embodiment of the invention. In FIG. 19A, the bore or cup 52 has a radius formed in the bottom dimension so that as the free end 53 of the spring retainer is forced toward the center of the bore, it will not bind on the bottom of the cup. Thus, when a hook eye is placed between leg 53 and the wall, as illustrated in FIG. 19A, and pushed down as illustrated in FIG. 19B, end 53 of spring member 50 is deflected toward the center of the bore as hook eye 57 approaches the bottom of bore 52, and the wire forming the hook eye passes the end of spring retainer leg 53. In FIG. 19C, the spring retainer is snapped toward the wall of bore 52 and enters hook eye 57. Hook eye 57 may then be drawn out of bore 2, as shown in FIG. 19D, with the spring retainer passing through the hook eye securing it to lure body 51.

Any attempt to remove the hook from the connector by pushing the hook into bore 52 and pulling it out will fail to disconnect hook eye 57 from connector 54. For example, in FIG. 19C, when the hook is in the lowest position, the end of retainer leg 53 is still through the eye of the hook, and if the hook is depressed even further, it is stopped by the bottom of the bore and forced toward the center, causing the retainer arm 53 to enter further into the eye.

FIGS. 20A through 20D illustrate the steps of removing a hook from a prior art retainer. FIG. 20A shows hook eye 57 positioned so that the eye is moved down the free leg 53 of the retainer spring. Hook eye 57 stops at the position shown in FIG. 20B, which is the same position as when the hook is installed, as shown in FIG. 19C. Eye 57 is pressed against the wall of bore 52 and the end of spring retainer leg 53 is positioned in the center of eye 57. Hook eye 57 is then twisted through 90°, as illustrated in FIG. 20C. This causes one side of the hook eye to engage spring retainer arm 53 and create a fulcrum against which the hook eye may be rotated to snap it free from the end of the spring retainer leg 53. Hook eye 57 becomes disengaged from the retainer, as illustrated in FIG. 20D, since the rotating motion of the hook eye deflects the end of the spring retainer arm 53 away from the wall of bore 52, allowing the hook to pass therebetween. After the hook eye is free of the retainer, it is removed by pulling it straight out of the bore 52, as illustrated in FIG. 20D. Using the connector means of U.S. Pat. No. 4,095,315, shown in FIGS. 16 through 20D, the hook eye of any standard hook, such as the book shown in FIG. 10, can be made to lie up or down, as desired. The system of my previous patent (U.S. Pat. No. 4,229,899) provides a variable path fishing lure system by means of which the effective density of the fishing lure may be changed so that the lure may be presented to the fish regardless of the depth at which fish are feeding. This is accomplished by using a removable weed guard of the invention as a calibrating means. According to U.S. Pat. No. 4,229,899, calibrated hooks change the effective density of the lure. Using the system of the invention, a weed guard is calibrated to change the lure density.

According to the fishing lure system of the present invention, a variety of calibrated weed guards are provided which may be selected for use with various lure bodies having different hydrodynamic shapes. The weed guards of the invention are of different dimensions and calibrated weights so that, by selecting an appropriately weighted weed guard, a lure may be caused to have an effective density which allows it to operate at a depth where the fish are feeding. It is further contemplated that weed guards of different weights may be utilized in different positions along a lure body to cause the hydrodynamic action of the lure to change. For example, FIG. 16 shows a lure body having multiple hooks attached thereto. If hook eye 57 has a lightweight weed guard and hook eye 56 has relatively heavy weed guard, the fishing lure will have nose-down attitude when it is used as its equilibrium point in the water and its action will be abrupt and deep diving. Alternatively, the heavier weed guard may be placed at the rear of the lure with a lighter weed guard at the forward end and the diving action of the lure will be shallower, providing the impression of an injured minnow attempting to surface.

Figure 3B:
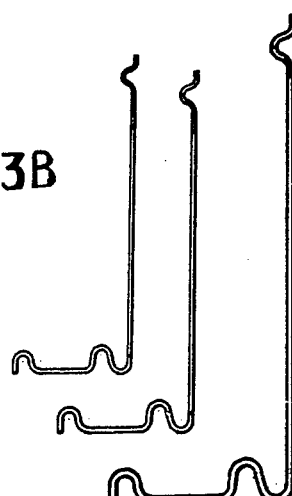
FIG. 3B is a side elevational view of a set of weedguards of FIG. 3.

A calibrated weed guard can be properly selected so that when attached to a hook which is joined to a lure, the lure will have a buoyancy equilibrium at various depths from the deepest level at which fish can be found up to the surface. A weed guard can be calibrated to change the lure density by using a smaller diameter wire or larger diameter wire and by increasing or decreasing the length of the weed guard at end 15, shown in FIG. 3, or at end 13 shown in FIGS. 3 and 3A. A non-limiting example of a set of calibrated weedguards is shown in FIG. 3B. Other calibrated sets will be apparent to those skilled in the art.

Figure 21:
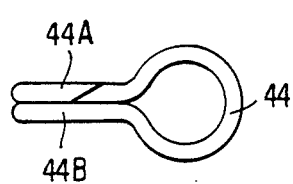
FIG. 21 is an enlarged side elevational view of a connector of FIG. 15.
Figure 21A:
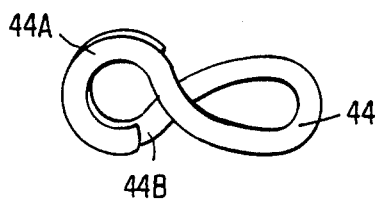
FIG. 21A is a top view of the connector of FIG. 21.
Figure 21C:
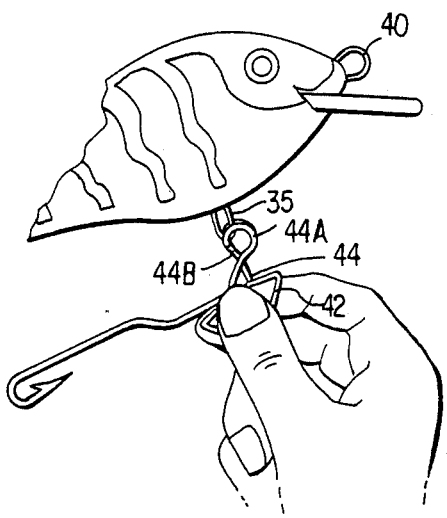
FIG. 21C is a perspective view of a connector of FIG. 21 being inserted into a standard figure eight connector engaged in a lure body.
Figure 21B:
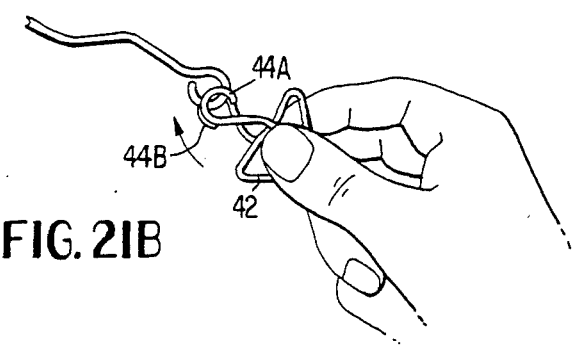
FIG. 21B is a perspective view of a connector of FIG. 21 being inserted into a hook eye using a hand tool of the invention.
Figure 21D:
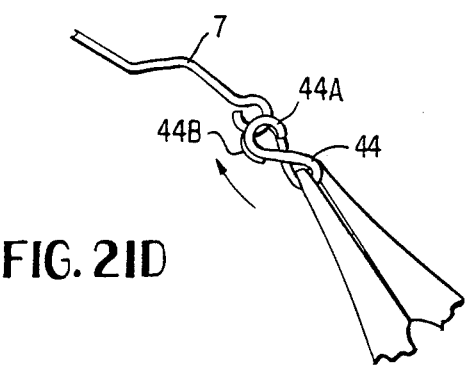
FIG. 21D is a perspective view of engagement of a connector of FIG. 21 into a hook eye, using pliers.
Figure 21E:
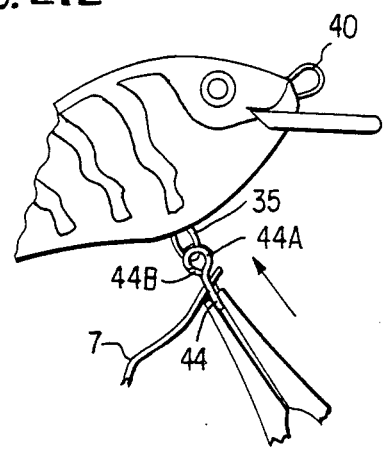
FIG. 21E is a view similar to FIG. 21C, using pliers instead of a connector of the invention.
Figure 22:
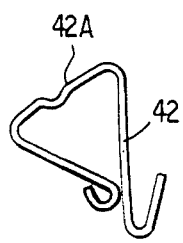
FIG. 22 is a side elevational view of a hand tool of the invention.
Figure 22A:
FIG. 22A is an end view of a hand tool of FIG. 22.
Figure 22B:
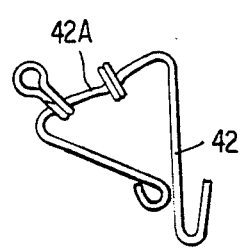
FIG. 22B is a side elevational view of a hand-tool of FIG. 22 used for storing small parts.

FIG. 21 shows a new enlarged connector means 44, as already described with respect to FIGS. 13, 15 and 15A. Connector means 44 rotates hook 29 to a position with the hook lying up and down on the lure. FIG. 21 shows a top view of connector means 44. FIG. 21B illustrates connector 44 attached to a hook eye by use of hand tool 42. Hand tool 42 is also shown in FIGS. 22, 22A and 22B. FIG. 21C shows how the connector and hook are secured to lure body eye 35. Connector 44 is angled at 44A to allow easy installation of the hook eye in installing connector 44 to lure eye 35. Space 44B allows the hook eye to engage with new connector 44. FIGS. 21D and 21E show use of pliers as a tool for inserting connector 44 to hook eye 7 and lure body connector 35. FIG. 22 shows hand tool 42 having bend 42A in the intermediate portion. In FIG. 22B, use of hand tool 42 as a storage unit for small parts, thus avoiding losing such small parts in a tackle box, is shown.

In FIGS. 23A through 23C, a comparison of the prior art with the system of the invention is shown. FIG. 23A shows how plastic worms are presently rigged for a weedless effect, in a Texas rig (prior art). FIG. 23B shows a worm after a few casts have been made, using a Texas rig system of FIG. 23A. FIG. 23B shows that, after a few casts have been made and lubricant on the plastic worm has washed off, friction as the worm is retrieved causes the hook point to be pulled through the plastic worm body exposing the hook tip to catch grass instead of bass, causing los of the worm and the hook. FIG. 23C shows a worm rigged using a weed guard 8 of the invention. The hook passes through the plastic worm body at 90° to the length of the worm body, and thus there is more plastic around the hook and no likelihood of the hook point being exposed due to friction (FIG. 23B). The hook point is protected by weed guard 8. FIG. 24 shows live bait 43 enclosed on hook 29 by weed guard 8. The bait is unable to swim off the hook and is unlikely to be slung off the hook during casting.

Figure 25:
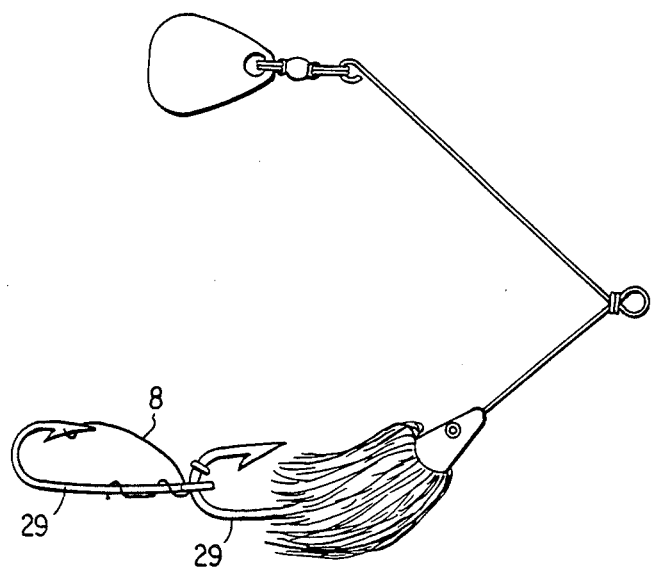
FIG. 25 is a side elevational view of a trailer hook having a weed guard of FIG. 3 engaged therewith on a spinner bait.
Figure 26:
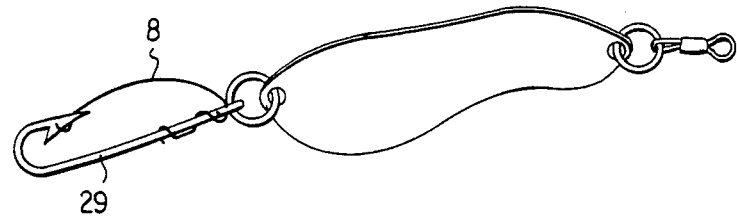
FIG. 26 is a side elevational view of a hook having a weed guard of FIG. 3 engaged thereon used with a spoon lure and split rings of the prior art.
Figure 27:
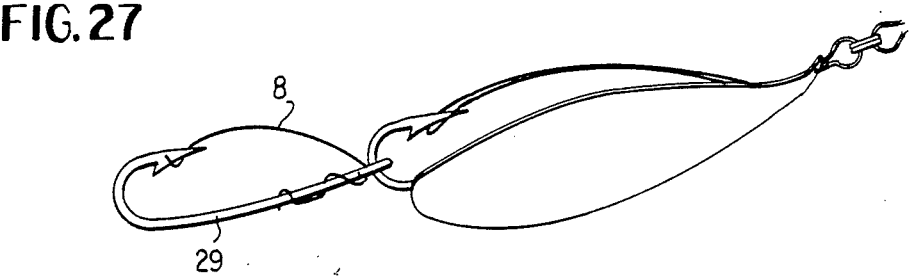
FIG. 27 is a side elevational view of a trailer hook having a weed guard of FIG. 3 engaged thereon secured to a spoon by means of a spoon hook.

FIG. 25 shows another use of the weed guard of the invention. Trailer hook 29 with weed guard 8 attached is then attached to another hook 29 to which a spinner bait is attached. Trailer hooks are desirable for use with spinner bait, but need weed guard protection. Prior art means of making a hook weedless using lead, etc. make the hook too heavy to be used as a trailer hook. New weed guard 8 is lightweight and is, therefore, unexpectedly useful. FIG. 26 shows use of weed guard 8 on a spoon which can be retrieved slowly or stopped completely, if required, without getting snagged on bottom trash. A standard hook eye is used with a standard split ring as the hook point will lie up and down, as desired. In another use, shown in FIG. 27, trailer hook 29 with weedless means 8 is attached to a spoon with a fixed Johnson spoon. The spoon can be retrieved slowly or stopped completely, without snagging on trash, etc. The standard hook eye position may be used, but the eye is enlarged to pass over the hook barb on the spoon.

Figure 28A:
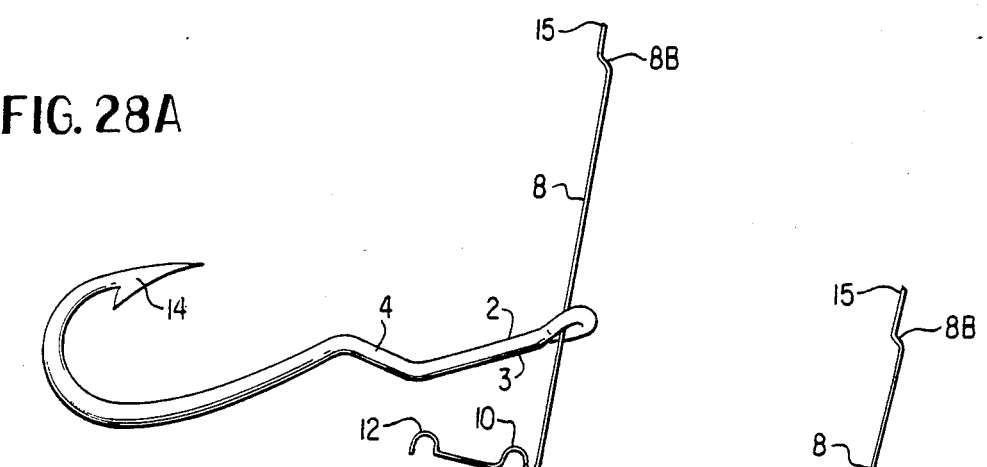
FIGS. 28A, B, C and D are perspective views illustrating, in sequence, the steps of installing of a weed guard of FIG. 3 on a fish hook.
Figure 28B:
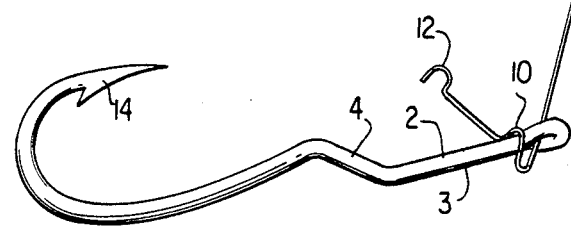
Figure 28C:
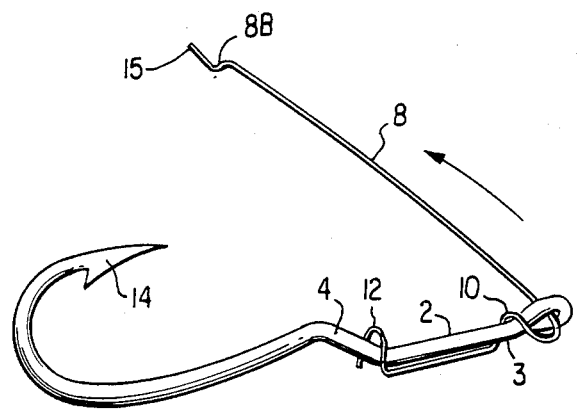
Figure 28D:
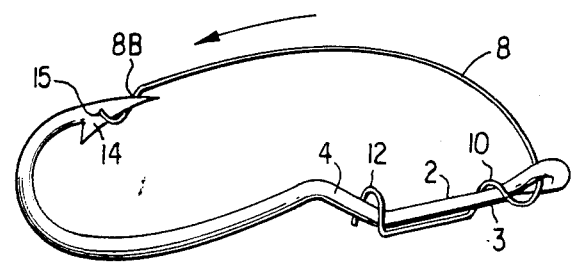

FIGS. 28A through 28D shown installation of a weed guard of FIG. 3 onto a hook. FIG. 28A shows wire form part 8 which is a single piece of wire having bends 12 in one end and bend 8B in the other end. End of wire 15 passes through the eye of the hook. FIG. 28B shows bend 10 of the wire, adjacent hook shank 2. Bend 10 passes over shank 2 and continues under shank portion 3. FIG. 28C shows free end 13 passing over the shank at shank portion 4 and locking into place on shank 4 in a corkscrew action around the hook shank. Once in place on the hook shank, any action against wire form 8 will tend to cock wire part 8 into a spring, thereby causing part 8 to return to its original position once the pressure is released. To remove weed guard 8 from the hook shank, the procedures described above are reversed. The end of the wire form 8B which passes through the hook eye is now in a position to have bend 8B cocked into place under and in front of the hook barb and point 14, as shown in FIG. 28D, thereby protecting the barb and point from catching on trash and weeds, etc. The assembled hook and weed guard is shown in FIG. 2.

Figure 29A:
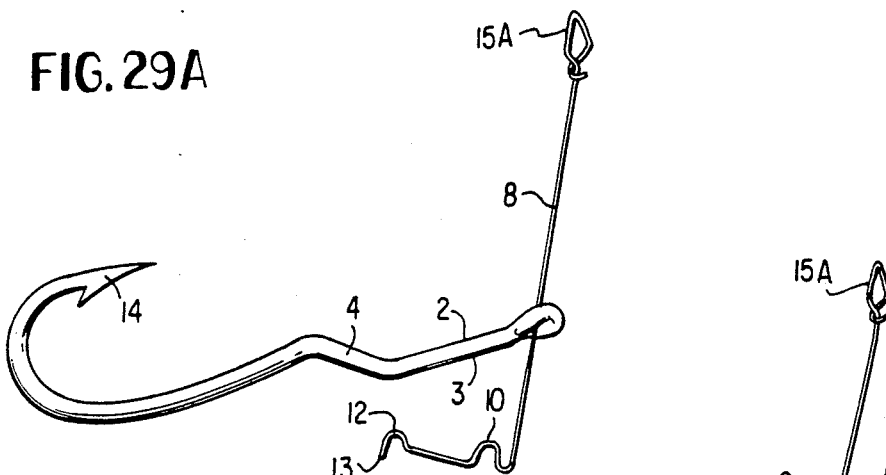
FIGS. 29A, B, C and D are perspective views illustrating, in sequence, the steps of installing a weed guard of FIG. 3A on a fish hook.
Figure 29B:
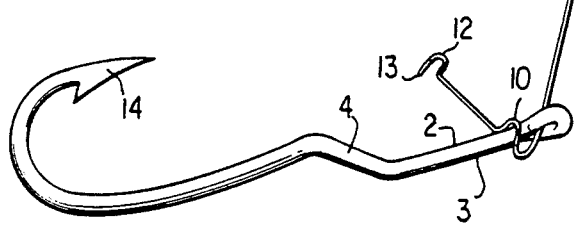
Figure 29C:
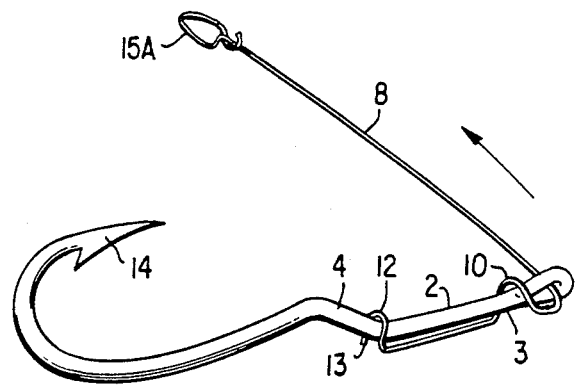
Figure 29D:
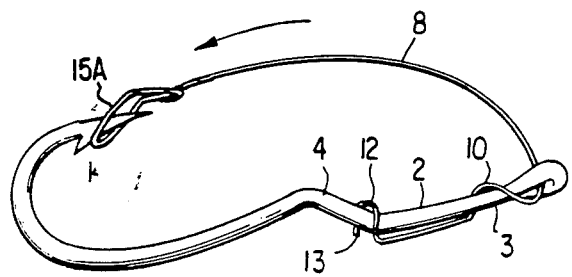
Figure 30A:
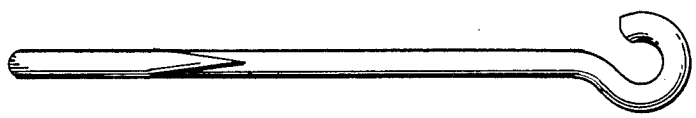
FIGS. 30A, B, C, D, E, and F are side elevational views of six open eye hooks for use without connectors.
Figure 30B:
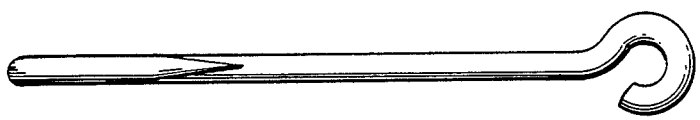
Figure 30C:
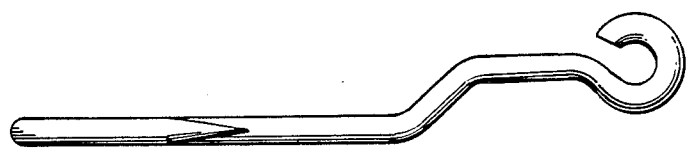
Figure 30D:
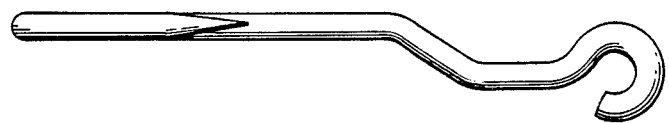
Figure 30E:
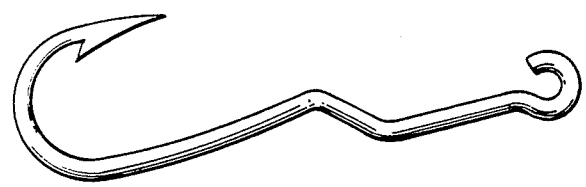
Figure 30F:
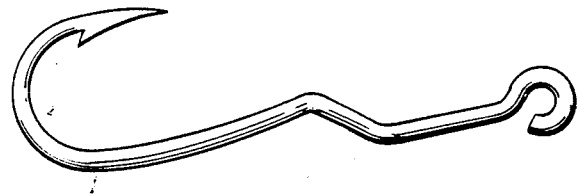

FIGS. 29A through 29D show wire form part 8, as shown in FIG. 3A. Wire form part 8 is a single piece of wire with bend 12 in one end and diamond shaped bends 15A in the other end. End of wire 12 passes through the top of the hook eye and the bend of wire 10 nearest hook shank 2 passes over shank 2 and continues around and under shank portion 3, as shown in 29C. Free end 13 passes over shank portion 4 and is locked in place on shank 4 similarly to a corkscrew action around the hook shank. Once in place on the hook shank, any action against wire form 8 will tend to cock wire form part 8 into a spring, thereby causing the part to return to its original position when pressure is released. To remove weed guard 8A from the hook shank, the procedures described above are reversed. The end of wire form 8, which is diamond shaped, is now in a position to have bend 15A cocked into place under and in front of hook barb end 14, as shown in FIG. 29D thereby protecting the barb and hook point from catching on trash and weeds, etc.

FIGS. 30A through 30F show hooks having hook eyes left open to eliminate the need for connector means between the hook eye and a built in swivel in a lure body. After insertion of an open eye into the lure body connector, the hook eye is closed to capture the hook on the lure body.

While the invention has been described above with respect to certain embodiments thereof, it will be appreciated that various changes and modifications may be made without departing from the spirit and scope of the invention. The scope and breadth of the invention is to be determined from the claims which follow, as well as from the description above.

I claim:

1. Fishing apparatus comprising a set of weight-calibrated, removable and replaceable weed guards, each weed guard of said set being attachable to a single pointed hook attached to a lure whereby a weed guard of said set is a means for adjusting the effective density of said lure.

2. Fishing apparatus as in claim 1 wherein a weed guard attached to a front portion of a lure is heavier than a weed guard attached to a rear portion of a lure for causing a nosedown attitude of said lure thereby changing the equilibrium position of the lure in the water and changing the diving characteristics of the lure.

3. Fishing apparatus as in claim 1, wherein said weed guards each comprise a wire having a substantially constant diameter and the calibration of said weed guards is accomplished by changing the diameter of the wire forming the weed guard.

4. Fishing apparatus as in claim 1, wherein said weed guards each comprise a wire of fixed length and the calibration is accomplished changing the length of the wire forming the weed guard.

5. Fishing apparatus as in claim 1 wherein at least one weed guard is bent so as to fit a fish hook having a straight shank portion.

6. Fishing apparatus as in claim 5, wherein at least one weed guard is bent so as to fit a fish hook including a hook shank bent toward its left side.

7. Fishing apparatus as in claim 5, wherein at least one weed guard is bent so as to fit a fish hook including a hook shank bent toward its right side.

8. Fishing apparatus as in claim 5, wherein at least one weed guard is bent so as to fit a fish hook having an eye in which a plane passing through said eye is perpendicular to the plane of the hook.

9. Fishing apparatus as in claim 1, wherein said weed guards are detachable and replaceable, said set of weed guards comprising members selected from the group consisting of: (a) calibrated weed guards which allow the lure to remain a floating surface lure by means of positive buoyancy, (b) calibrated weed guards which adjust the effective density of the lure so as to change the lure to negative buoyancy, thereby causing said lure to become a sinker type lure, and (c) calibrated weed guards which are selected so as to change the effective density of the lure causing said lure to achieve neutral buoyancy at predetermined depths in fresh or salt water.

10. Fishing apparatus as in claim 1, comprising a live bait fish hook and one of said set of weed guards attached thereto for securing live bait on said hook.

11. Fishing apparatus as in claim 1, comprising a standard bait hook and one of said set of weed guards attached to said hook for securing non-live bait on said hook.

12. Fishing apparatus as in claim 10, comprising a plurality of lure bodies having an attached single pointed hook and one of said weed guards in place to protect a hook point from snagging weeds, limbs, trash, or other debris found in water and around water's edge.

13. Fishing apparatus as in claim 12, comprising a trailer hook and said weed guard in place on said hook installed on spinner bait.

14. Fishing apparatus as in claim 12, comprising a trailer hook and said weed guard in place on said trailer hook and said trailer hook in place on a spoon, wherein an enlarged eye of said trailer hook passes over said spoon.

15. Fishing apparatus as in claim 12, comprising a trailer hook and said weed guard in place on said trailer hook, and said trailer hook in place on said spoon by means of a split ring, said split ring being attached also to said spoon by means of a hole in said spoon.

16. Fishing apparatus as in claim 12, comprising rigs including fish hooks and attached weed guards.

17. Fishing apparatus as in claim 12, comprising a hook having a plastic worm and said weed guard in place on said hook, whereby said worm is encircled on the hook so that the worm is protected from being pulled off the hook, wherein a curved section of the hook passes through a body portion of the plastic worm at right angles to the length of the body portion.

18. Fishing apparatus as in claim 17, comprising a fish hook, adapted for use with a plastic worm, said fish hook including a shank portion and an eye portion, and said weed guard in place, said shank portion being free from small barbs adjacent the eye portion.

19. A fishing apparatus as in claim 1, comprising a hook and a weed guard in place on said hook adapted with means for adjusting tension of said weed guard for greater or lesser tension of said weed guard according to its displacement when a fish strikes at bait enclosed on said hook.

20. Fishing apparatus as in claim 1, comprising a set of single point hooks, a set of calibrated weed guards of varying weights and a set of connectors, wherein a single point hook attached to a lure changes the density of the lure, and said hooks, calibrated weed guards and connectors comprise a kit for replacing treble hooks on a lure, whereby said kit enables the lure to comprise either a floater, a sinker, or a neutral buoyancy lure.

21. Fishing apparatus as set forth in claim 1, comprising a fish hook with hook eye rotated 90 degrees, on which said weed guard fits.

22. Fishing apparatus as in claim 1, comprising a lure eye connector for attaching hooks to said lure body, and connector means for rotating an eye connector through 90 degrees when said hooks are attached to said lure body.

23. Fishing apparatus as in claim 1, comprising a lure having a wire inner connector attached between a figure eight connector and a single point hook for rotating the hook through 90 degrees, enabling a single pointed hook to lie up or down on a lure body.

24. Fishing apparatus as in claim 23, wherein the wire connector comprises a space between each free end of said connector and the next closest section of the wire part connector means of sufficient size as to allow an outer diameter of the wire used in both the lure body connector means figure eight and the desired hook wire diameter used to make the hook pass therein between.

25. Fishing apparatus as defined in claim 24, wire form connector means comprises angled end means for facilitating installation of hook eye and lure connector means.

26. Fishing apparatus as in claim 24 comprising a hand tool for holding said connector means while installing said connector means to hook eye and lure body connector means.

27. Fishing apparatus as in claim 1, comprising a fishing implement including a lure body comprising hooks and biased hook retainers with free ends located in recessed cups, whereby
a hook eye is pressed into a cup until the hook eye is adjacent to the free end of said retainer; and
each hook eye is rotated 90 degrees to disengage the hook eye from said retainer and the hook eye is withdrawn from said associated cup thereby allowing standard single pointed hooks to lie with hook points up and down with respect to the body of the lure.

28. Fishing apparatus as in claim 1, wherein said removable and replaceable weed guard comprises a wire having a longer portion and a shorter portion separated by a bend and said weed guard is installed on a hook having an eye by first inserting the longer portion of said weed guard through a bottom side of said hook eye until the shorter portion which includes multiple wire bends reaches the bend in the weed guard adjacent the longer portion of the wire, this bend being placed under said hook eye and remaining bends are placed alternately over, under and over a shank portion of said hook to install the weed guard in place on said hook, the longer portion of the wire being bent towards a point portion of the hook, moved past and under the point portion and then moved up and under the hook point portion, wherein the weed guard is removed from the hook by reverse procedures.

29. Fishing apparatus as in claim 1, wherein said removable and replaceable weed guard comprises a diamond end bend said weed guard being installed on a hook by inserting a short end of the weed guard having multiple bends through a top side of an eye portion and shank portion of said hook in corkscrew fashion until a free end of the weed guard is latched into place on a shank portion of the hook, wherein the diamond end bend is bent towards the hook point and past said point and then moved under said hook point and allowed to move up and under said hook point, wherein said weed guard is removed from the hook by reverse procedures.

30. Fishing apparatus as in claim 10, comprising a fish hook having an open eye portion for eliminating need for connector means therebetween, wherein said open eye portion is passed directly into lure body connector means comprising built-in swivel means, and wherein open the eye portion of the hook is closed to secure said hook onto a fishing implement, and a weed guard is attached thereto.

31. Fishing apparatus as in claim 11, comprising a fish hook having an open eye portion for eliminating need for connector means therebetween, wherein said open eye portion is passed directly into lure body connector means comprising built-in swivel means, and whereby open the eye portion of the hook is closed to secure said hook onto a fishing implement, and a weed guard is attached thereto.

32. Fishing apparatus as in claim 1, wherein said weed guard is fabricated from spring wire.

33. Fishing apparatus as in claim 1, wherein said weed guard is fabricated from a flat spring leaf.

34. Fishing apparatus as in claim 1, wherein said weed guard is fabricated from fiberglass filament.

35. Fishing apparatus as in claim 1, wherein said weed guard is fabricated from boron filament.

36. Fishing apparatus as in claim 1, wherein said weed guard is fabricated from carbon filament.

37. A fish hook having an eye, shank, and barb, in combination with a removable and replaceable wire weed guard, wherein said guard comprises:
an overall L-shaped wire having a mast, a leg perpendicular to and shorter than said mast, and an elbow connecting said mast to said leg;
said mast having a hook-barb contacting portion located at an end opposite said elbow;
said leg having a first S-shaped bend connecting said elbow, a second U-shaped bend located at an end opposite said first bend, and a straight portion connecting said first and second bends;
wherein said weed guard is combined with said hook by positioning: said elbow within said eye; said mast extending up to and having said hook-barb contacting portion contacting said barb; said S-shaped bend spirally wound around said shank; and said U-shaped bend wound upon said shank.

38. A weed guard as in claim 37, wherein the length of the weed guard is chosen according to a predetermined weight of the weed guard.

39. A weed guard as in claim 37, wherein the wire is of a thickness chosen according to a predetermined weight of the weed guard.

* * * * *